(12) United States Patent
Rao et al.

(10) Patent No.: US 8,769,277 B2
(45) Date of Patent: Jul. 1, 2014

(54) CONTENT RETRIEVAL

(75) Inventors: Ravi T. Rao, Redmond, WA (US);
Khaja E. Ahmed, Bellevue, WA (US);
R. Scott Briggs, Redmond, WA (US);
Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1413 days.

(21) Appl. No.: 12/144,611

(22) Filed: Jun. 23, 2008

(65) Prior Publication Data

US 2009/0320099 A1    Dec. 24, 2009

(51) Int. Cl.
*H04L 29/06* (2006.01)
*G06F 21/00* (2013.01)

(52) U.S. Cl.
USPC ............ 713/168; 709/217; 713/163

(58) Field of Classification Search
USPC ................................ 709/217, 218
See application file for complete search history.

(56) References Cited

U.S. PATENT DOCUMENTS

| | | | |
|---|---|---|---|
| 6,366,947 B1 | 4/2002 | Kavner | |
| 7,286,476 B2 | 10/2007 | Helmy et al. | |
| 2002/0198929 A1 | 12/2002 | Jones et al. | |
| 2003/0101267 A1 | 5/2003 | Thompson et al. | |
| 2003/0236837 A1 | 12/2003 | Johnson et al. | |
| 2004/0068652 A1* | 4/2004 | Carpentier et al. | 713/168 |
| 2006/0212584 A1 | 9/2006 | Yu et al. | |
| 2007/0050761 A1* | 3/2007 | Hester et al. | 717/168 |
| 2007/0088795 A1 | 4/2007 | Dunbar | |
| 2007/0198726 A1 | 8/2007 | Marco et al. | |
| 2008/0082648 A1* | 4/2008 | Ahmed et al. | 709/223 |

OTHER PUBLICATIONS

"Vortex Programming Interfaces", Trifox, INC., 1985-2008, pp. 1.
Hull, et al., "The Vortex Approach to Integration and Coordination of Workflows", Feb. 10, 1999, pp. 1-7.
Sheth, et al., "Processes Driving the Networked Economy", IEEE, 1999, pp. 1-15.
"WAN Acceleration Technology", retrieved at <<http://www.tredent.com/riverbed/wan-acceleration.php>>, pp. 1-4.
"Wan Acceleration", retrieved at <<http://www.anuesystems.com/documents/AnueAppNoteWANAcc1007.pdf>>, Anue System, INC, pp. 6.

* cited by examiner

*Primary Examiner* — Gilberto Barron, Jr.
*Assistant Examiner* — Simon Kanaan
(74) *Attorney, Agent, or Firm* — Andrew Sanders; Micky Minhas

(57) ABSTRACT

Content retrieval techniques are described. In an implementation, a determination is made as to whether a client is permitted to receive content requested by the client. When the client is permitted to receive the content, a communication is formed to be communicated via a wide area network that includes a hash list having a hash of each of a plurality of blocks of the content, each hash being configured to enable the client to locate a corresponding one of the blocks of the content via a local area network.

20 Claims, 6 Drawing Sheets

CONTENT RETRIEVAL

BACKGROUND

Users may obtain content from a wide variety of content providers through the use of networks and computers. For example, a user may interact with a personal computer (PC) and browser to retrieve content (e.g., a digital song, a video file, a news article, and so on) via the Internet. The content may be maintained in the same city as the user, from a different state and even from an opposite side of the globe from the user. Consequently, even though network connections may be configured to stretch across these different geographical distances, the speed at which the content may be retrieved may vary with the corresponding distance.

SUMMARY

Content retrieval techniques are described. In an implementation, a determination is made as to whether a client is permitted to receive content requested by the client. When the client is permitted to receive the content, a communication is formed to be communicated via a wide area network that includes a hash list having a hash of each of a plurality of blocks of the content, each hash being configured to enable the client to locate a corresponding one of the blocks of the content via a local area network.

In an implementation, a request for content is formed to be communicated to a content provider over a network. A response is received to the request from the content provider that includes a hash list having a hash of each of a plurality of blocks of the content. The hash list is broadcast to a plurality of clients. Each of the hashes are configured to enable a corresponding one of the clients to determine whether a corresponding block of the content is cached locally by the corresponding client.

In an implementation, one or more computer readable media include instructions that are executable by a computer to provide one or more modules that are callable, by a network program that is executing on the computer, to form a request to be communicated to a content provider over a network for content. The one or more modules are also callable to broadcast a hash list received from the content provider to a plurality of clients. Each of the hashes is configured to enable a corresponding client to determine whether the corresponding block of the content is cached locally by the corresponding client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
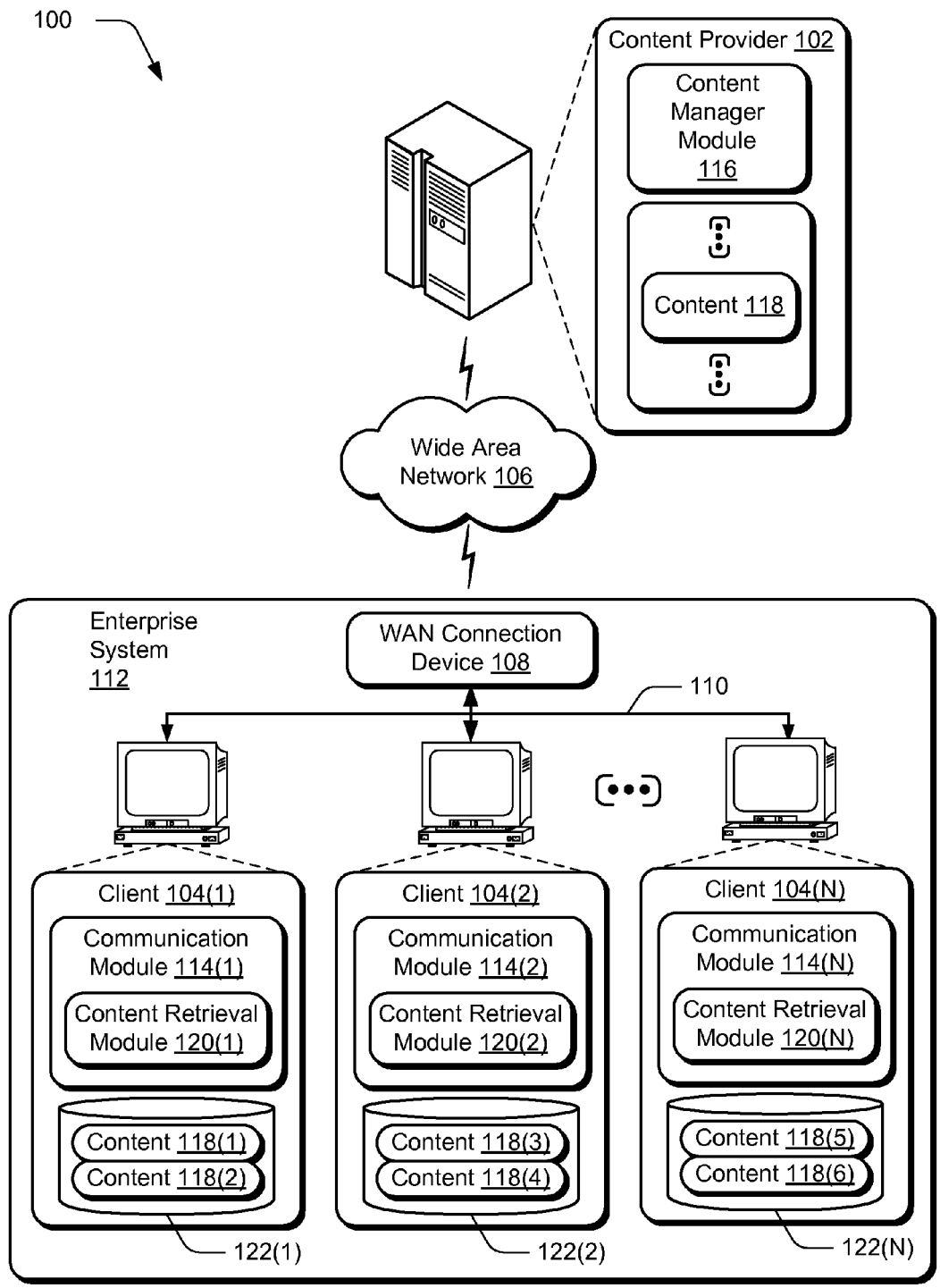
FIG. 1 is an illustration of an environment in an example implementation that is operable to employ techniques to retrieve content.

The use of networks (and clients that may be used to access those networks) has enabled users to obtain content from a wide variety of content providers across varying geographical distances. However, even though network connections may be configured to stretch across these varying geographical distances, the speed at which content may be retrieved across these distances may vary with the distance at which the content is located from a user that requested the content. Additionally, the traditional provision of the content across these distances may become even more inefficient when a plurality of users that are located relatively close together, one to another, each request communication of the content from the content provider.

Content retrieval techniques are described. In an implementation, an architecture is provided in that is callable by applications and/or protocols over a local area network to obtain content that was previously obtained via a wide area network. For example, a plurality of users may be arranged in a branch office of a corporation. A president of the corporation may make a slideshow presentation available via a server located at the corporation's headquarters, which may be a significant geographic distance from the branch office, and consequently the plurality of users. Using traditional content communication techniques, each of the users (and more particularly clients of the users) accessed the server over a wide area network (e.g., the Internet) to download the presentation. Consequently, the download of the presentation for each of the users of the branch office may consume a significant portion of bandwidth that is available to the branch office via the wide area network.

In an implementation, caching techniques are described such that a download of the presentation by a first user of the branch office may be leveraged for subsequent users of the branch office. In this way, each of the users of the branch office does not consume valuable resources on the wide area network, but rather may obtain the presentation from a cache of the user via the local area network.

In an implementation, a content provider (e.g., a source off the content) may enforce digital rights management techniques to control access to the content. For example, a request for content may be communicated to the content provider, which may then determine whether the client that requested the content is permitted to access the content. If the client is permitted to access the content, the content provider may provide a hash list which may then be used by the client to locate the content. A variety of other digital rights management techniques are also contemplated, further discussion of which may be found in the following discussion.

In the following discussion, an example environment and systems are first described that are operable to perform techniques to manage content. Example procedures are then described that may be employed in the example environment, as well as in other environments. Although content management is described in relation to an enterprise system in the following discussion, it should be readily apparent that a wide variety of environments may be utilized without departing from the spirit and scope thereof, such as to manage digital music via a network.

Example Environment

FIG. 1 is an illustration of an environment 100 in an example implementation that is operable to perform content retrieval techniques. The illustrated environment 100 includes a content provider 102 and a plurality of clients 104(1), 104(2) through 104(N) that are communicatively coupled to the content provider 102 via a wide area network 106.

The clients 104(1)-104(N) may be configured in a variety of ways. For example, the clients 104(1)-104(N) may be configured as a computer that is capable of communicating over the wide area network 106, such as a desktop computer, a mobile station, an entertainment appliance, a set-top box communicatively coupled to a display device, a wireless phone, a game console, and so forth. Thus, the clients 104(1)-104(N) may be configured as client devices that range from full resource devices with substantial memory and processor resources (e.g., personal computers, game consoles) to a low-resource device with limited memory and/or processing resources (e.g., traditional set-top boxes, hand-held game consoles). The clients 104(1)-104(N) may also relate to a person and/or entity that operate the clients. In other words, clients 104(n) may describe logical clients that include software, e.g., an application and so on.

The clients 104(1)-104(N) are illustrated as being communicatively coupled to the wide area network (WAN) 106 using a WAN connection device 108. The WAN 106 may assume a wide variety of configurations. For example, the network 108 may include an Internet-Protocol compliant network (e.g., the Internet), a public telephone network, and so on. Further, although a single WAN 106 is shown, the WAN 106 may be configured to include multiple networks. Consequently, the WAN connection device 108 may be representative of one or more devices that may be used by the clients 104(1)-104(N) (either singly or together) to access the WAN 106. Therefore, although the WAN connection device 108 is illustrated separately from the clients 104(1)-104 (N), it should be readily apparent that functionality represented by the WAN connection device 108 may be incorporated by one or more of the clients 104(1)-104(N) without departing from the spirit and scope thereof.

The clients 104(1)-104(N) are also illustrated as being communicatively coupled, one to another, using a local area network (LAN) 110. The LAN 110 may be configured in a variety of different ways, such as a wired and/or wireless Ethernet network, an intranet, and so on. The clients 104(1)-104(N) are further illustrated as being arranged in an enterprise system 112. The enterprise system 112 is representative of clients (e.g., computers such as personal computer and servers; and software) employed by an organization (e.g., a corporation, school, and so on). The enterprise system 112 may optionally utilize one or more administrators to manage function of the clients, which may have defined privileges (e.g., to install and/or remove software or devices) that are not made available to typical users of the clients in the enterprise system.

Each of the clients 104(1)-104(N) is illustrated as including a respective one of the plurality of communication modules 114(1)-114(N). The communication modules 114(1)-114(N) are representative of functionality of the respective clients 104(1)-104(N) to communicate via the WAN 106 and/or the LAN 110. For example, the communication modules 114(1)-114(N) may be representative of applications and/or protocols that may be used to communicate via the networks, such as browsers, Hypertext Transfer Protocol (HTTP), and so on further discussion of which may be found in relation to FIG. 3.

In the illustrated implementation, the communication modules 114(1)-114(N) communicate with a content manager module 116 of the content provider 102 via the WAN 106 to obtain content 118. The content manager module 116 of the content provider 102 is representative of functionality to provide particular items of the content 118 that are requested by one or more of the clients 104(1)-104(N). The content manager module 116 may also be representative of functionality to configure the content 118 to be communicated via the wide area network 106.

The content 118, and consequently the content provider 102, may be configured in a variety of ways. For example, the content 118 may be configured as one or more webpages, a result of remote application processing, one or more files that are downloadable via the WAN 106 (e.g., via an FTP protocol), and so on. Thus, the content provider 102 (and the content manager module 116) may also be configured in a variety of ways. For example, the content provider 102 may be configured as a Web service, another client located remotely from the enterprise system 112 (e.g., a server in a server farm), and so on.

The communication modules 114(1)-114(N) of the respective clients 104(1)-104(N) are further illustrated as including respective content retrieval modules 120(1)-120(N). The content retrieval modules 120(1)-120(N) are representative of functionality to retrieve content for the respective clients 104(1)-104(N). For example, as illustrated in FIG. 1 the content retrieval module 120 may communicate with the content manager module 116 of the content provider 102 to obtain blocks of the content 118 to be stored in a queue 122(1), examples of which are illustrated as content 118(1) and content 118(2). Similar techniques may also be employed by the content retrieval modules 120(2), 120(N) of clients 104(1), 104(N) to obtain blocks of content 118 that are illustrated as content 118(3), 118(4) stored in a queue 122(2) of client 104(2) and content 118(5), 118(6) stored in a queue 122(N) of client 104(N).

Storage of blocks of the content 118(1)-118(6) may be used to support a variety of different functionality. For example, the content 118 may correspond to a slideshow presentation. Client 104(1), through the content retrieval module 120(1), may obtain first and second chapters of the slideshow presentation which are illustrated as blocks of the content 118(1), 118(2) that are stored in the queue 122(1). Similarly, client 104(2) may obtain third and fourth chapters of the slideshow presentation through the content retrieval module 120(2), which are illustrated as blocks of the content 118(3), 118(4) that are stored in the queue 122(2).

Client 104(N), however, may access the content provider 102 at a later time and request chapters two and three of the slideshow presentation, which correspond to the blocks of content 118(2), 118(3) in this example. Rather than communicate the requested chapters via the wide area network 106 to the client 104(N), the content manager module 116 may make the client 104(N) "aware" that the requested chapters may be available over the LAN 110, e.g., "within" the enterprise system 112. This awareness may be accomplished in a variety of ways, further discussion of which may be found in relation to the following figure.

Figure 2:
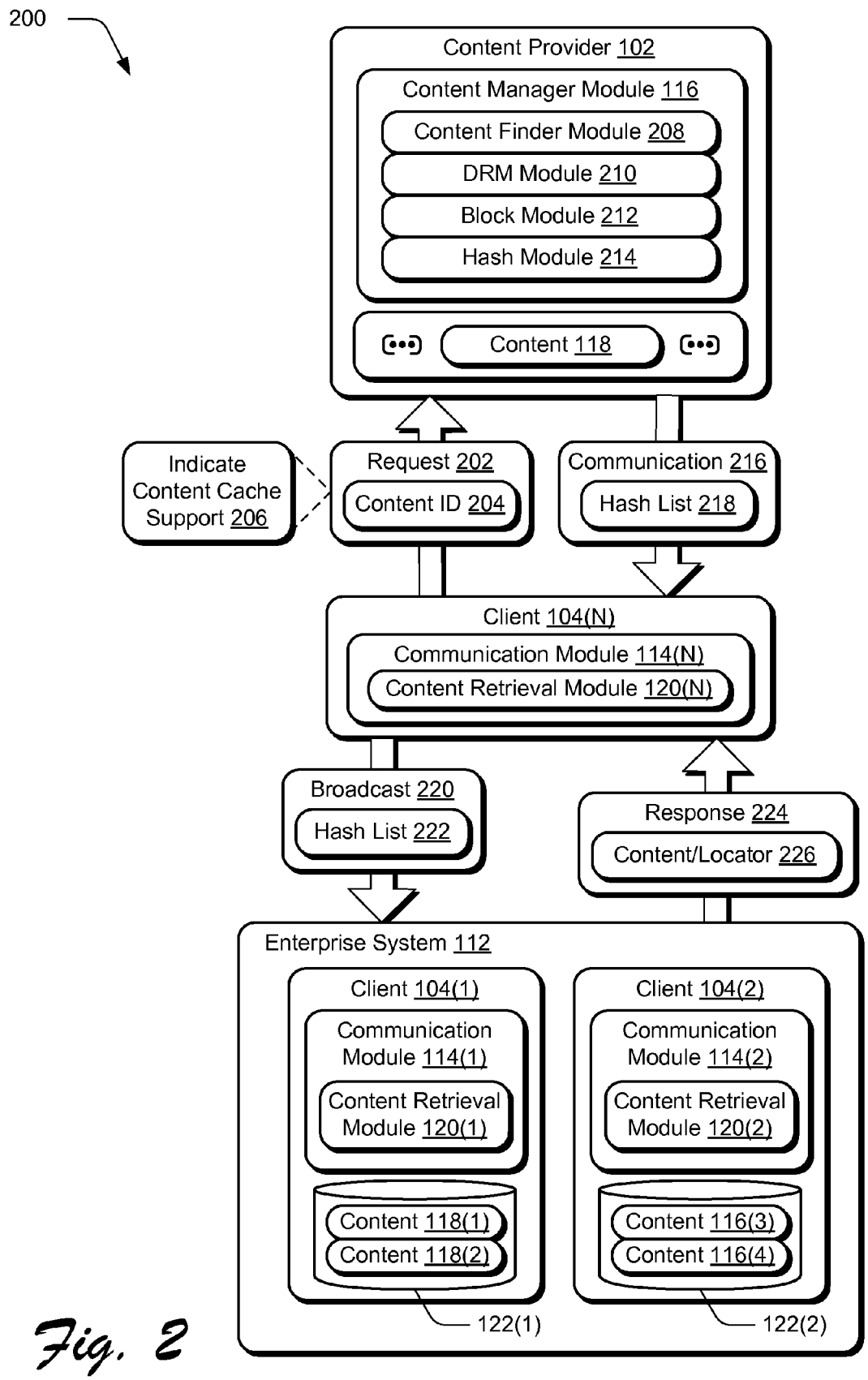
FIG. 2 is an illustration of a system in an example implementation showing the client of FIG. 1 as requesting content from a content provider, at least a portion of which is cached by a plurality of other clients in an enterprise system.

FIG. 2 depicts a system 200 in an example implementation showing the client 104(N) as requesting content from a content provider, at least a portion of which is cached by a plurality of other clients (e.g., clients 104(1), 104(2)) in an enterprise system. The client 104(N) may receive a request for content. For example, the client 104(N) may be configured as software that calls functionality represented by the communication module 114(N), such as browser/protocol functionality. The functionality represented by the communication module 114(N) may subsequently call functionality represented by the content retrieval module 120(N) to retrieve the requested content. Thus, in this example, the "calls" are made through layers of the client 104(N) represented as software (although it should be readily apparent that hardware functionality may also be incorporated), further discussion of which may be found in relation to FIG. 3.

The content retrieval module 120 may form a request 202 which includes a content ID 204, e.g., title of content to be obtained. In an implementation, the request 202 may also indicate content cache support 206, e.g., such as through a flag or other identifier included in a header of the request 202.

The content provider 102, and more particularly functionality represented by the content manager module 116, e.g. detects the indication of content cache support 206 in a header of the request 202. Accordingly, the content manager module 116 may invoke functionality that provides for local content retrieval of content of the content provider 102.

For example, the content manager module 116 is illustrated as including a content finder module 208, a digital rights management (DRM) module 210, a block module 212 and a hash module 214. The content finder module 208 is representative of functionality of the content provider 102 to locate content 118 that corresponds to the content ID 204 in the request 202. For instance, the content finder module 208 may employ a lookup table to determine where content 118 that corresponds to the content ID 204 (e.g., a title of the content 118) may be found, such as at a particular network address, a file in a hard drive, and so on.

The DRM module 210 is representative of functionality of the content provider 102 to determine whether the client 1 04(N) that requested the content 118 is permitted to access the content 118. For example, the DRM module 210 may determine conditional access rights of the client 104,(N) such as whether the client 104(N) has a current subscription to the content 118, has paid a one-time fee to access the content 118, is on an approved list of clients that are permitted to access the content 118, and so on. Although the DRM module 210 is illustrated at the content provider 102 for sake of clarity of FIG. 2, it should be readily apparent the functionality represented by the DRM module 210 may be employed in a variety of different ways, such as at a service that is accessed by the content provider 102 via a network.

The block module 212 is representative of functionality of the content provider 102 to form and/or determine which of a plurality of blocks correspond to the requested content 118. The cache module 214 is representative of functionality to form a unique identifier of each of the blocks of the content. For example, the block module 212 may form a plurality of blocks from the content 118. A hash module 214 may then compute a hash of each of the blocks formed from the content 118 to uniquely identify the blocks, both one from another and/or from other blocks that may be formed from other content. In this way, the blocks formed by the block module 212 may be uniquely identified using hashes formed by the hash module 214.

The content manager module 116 may then form a communication 216 having a hash list 218 that includes hashes of each of the blocks of the content 118 that was requested by the client 104(N). The client 104(N) may then use the hash list 218 to locate blocks of the content 118 that may be stored in queues "outside" of the content provider 102.

For example, the client 104(N) may form a broadcast 220 having a hash list 222 (which in this example corresponds to the hash list 218 received via the communication 216 although other examples are also contemplated) to be communicated to a plurality of clients, e.g., clients 104(1), 104(2) in enterprise system 112. Thus, the hash list 222 provides each of the clients 104(1), 104(2) with an identifier of blocks of content that are requested by client 104(N).

Accordingly, content retrieval modules 120(1), 120(2) may then form one or more responses 224 that include the content/locator 226 of the content. For example, the response 224 may return hashes that correspond to blocks of content (e.g., content 118(1)-118(4)) in a respective queue to indicate availability of the blocks of content to the client 104(N). In this example, the client 14(N) may then choose which queues 122(1), 122(2) are to be used to obtain the content.

In another example, the content retrieval modules 120(1), 120(2) may form the response 224 to include blocks of the content from respective queues that were referenced in the hash list 222. This response 224 may be formed in a variety of ways, such as after arbitration between the clients 104(1), 104(2) having the blocks of content. This arbitration may or may not include communication with the client 104(N) that requested the content 118. Communication may be performed at a variety of different layers of a stack to perform content retrieval, an example of which may be found in relation to the following figure.

Figure 3:
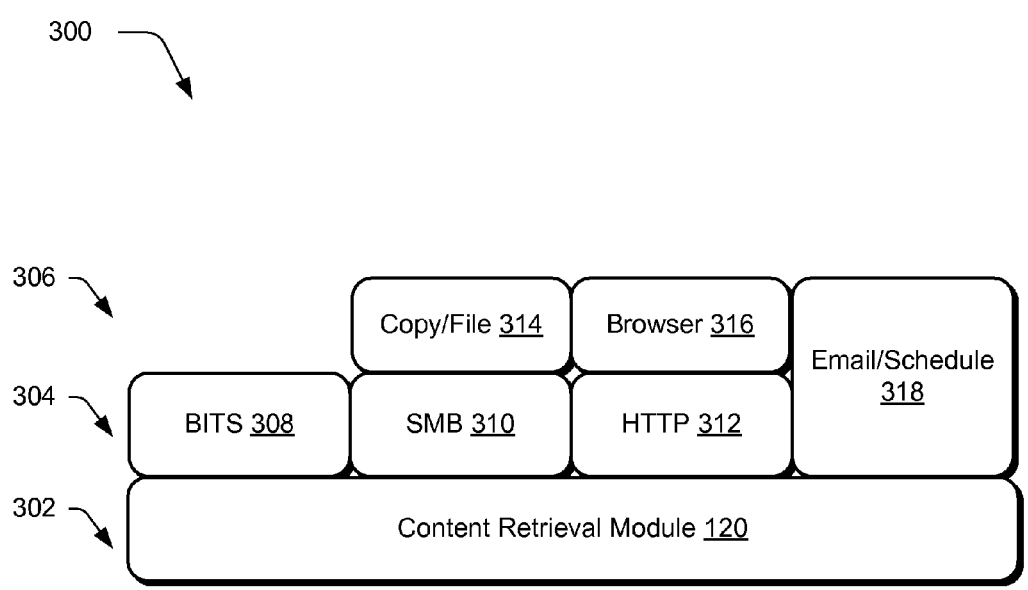
FIG. 3 is an illustration of a stack in an example implementation showing a plurality of different layers, one of which includes a content retrieval module.

FIG. 3 illustrates a stack 300 in an example implementation showing a plurality of different layers. The stack 300 depicts layers that may be implemented using software and hardware, each being operable to communicate to layers positioned above and below the respective layer, when available. In illustrated instance, the content retrieval module 120 (which may be representative of one or more of the content retrieval modules 120(1)-120(N) previously described) is illustrated as being implemented at a layer 302 that is "below" a protocol layer 304 and an application layer 306.

For example, the protocol layer 304 is illustrated as including a variety of examples of network protocols, such as a Background Intelligent Transfer Service (BITS) 308, a Server Message Block (SMB) 310 protocol, and a Hypertext Transfer Protocol (HTTP) 312. Each of the protocols may therefore call the content retrieval module 120 to employ functionality represented by the module. In this way, the protocols may avail themselves of this functionality without being written specifically to include this functionality.

Likewise, the application layer 306 is illustrated as including copy/file 314 (e.g., such as in an operating system) functionality and a browser 316. Following the previous example, these applications may also leverage functionality of the content retrieval module 120 indirectly through the protocols in the protocol layer 304. Additionally, applications in the application layer 306 may be configured to employ the functionality of the content retrieval module 120 directly, an example of which is illustrated by the e-mail/schedule 318 application in FIG. 3. Thus, the content retrieval module 120 may function to abstract content retrieval functionality to applications and protocols. Further discussion of content retrieval may be found in relation to the following procedures.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the content retrieval techniques described below are platform-independent, meaning that the techniques may be implemented on a variety of commercial computing platforms having a variety of processors.

Example Procedures

The following discussion describes retrieval techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and the stack 300 of FIG. 3.

Figure 4:
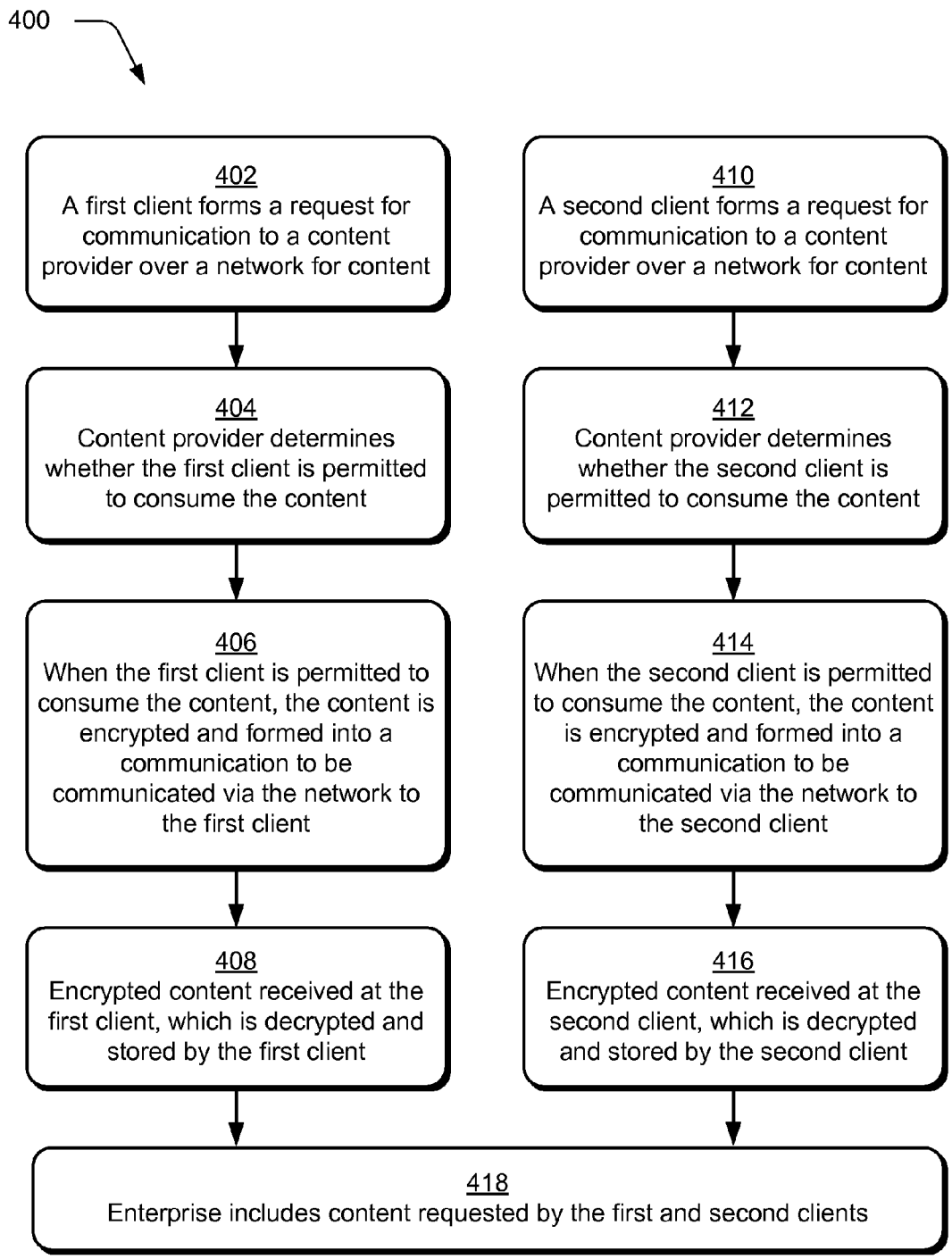
FIG. 4 is a flow diagram depicting a procedure in an example implementation in which a plurality of clients request content that is then cached locally at the respective clients.

FIG. 4 depicts a procedure 400 in an example implementation in which a plurality of clients request content that is then cached locally at the respective clients. A first client forms a request for communication to a content provider over a network for content (block 402). For example, the client may be configured a software such as a browser application, a "network aware" application (e.g., scheduling software), and so on. Additionally, a variety of different content may be requested, such as files, television content, digital music, and so on.

A content provider determines whether the first client is permitted to consume the content (block 404). Continuing with the previous example, the content provider 102 may employ the DRM module 210 to determine whether the client 104(1) is permitted to access content 118. This determination may be made locally at the content provider 102 and/or through communication with an "outside" DRM source over the wide area network 106.

When the first client is permitted to consume the content, the content is encrypted and formed into a communication to be communicated via the network to the first client (block 406). For example, the DRM module 210 may encrypt the content 118 with a public key of a public/private key pair of the client 104(1). The content 118 may then be packetized for communication over the wide area network 106 to the client 104(1).

The encrypted content is then received at the first client, which is then decrypted and stored by the first client (block 408). Continuing with the previous example, the client 104(1) may use the private key to decrypt the content received from the content provider 102 and store the content in the queue 122(1).

Similar techniques may also be employed for a second client to obtain content from the content provider. For example, the second client may form a request for communication to the content provider over the network for content (block 410). The content in this request may be the same as or different from the content requested by the first client. For instance, the content may be different chapters of the book, different slides the presentation, different portions of a spreadsheet, pages of a word processing document, pictures of a photo album, songs in the playlist, and so on.

Like the first client, the content provider may then determine whether the second client is permitted to consume the content (block 412). When the second client is permitted to consume the content, the content is encrypted and formed into a communication be communicated via the network to the second client (block 414). The encrypted content is received at the second client, which is decrypted and stored by the second client (thought 416). Thus, in this example the enterprise system 112 includes content requested by the first and second clients (block 418), which may be leveraged by subsequent users that desire access to the content, further discussion of which may be found in relation to the following figure.

Figure 5:
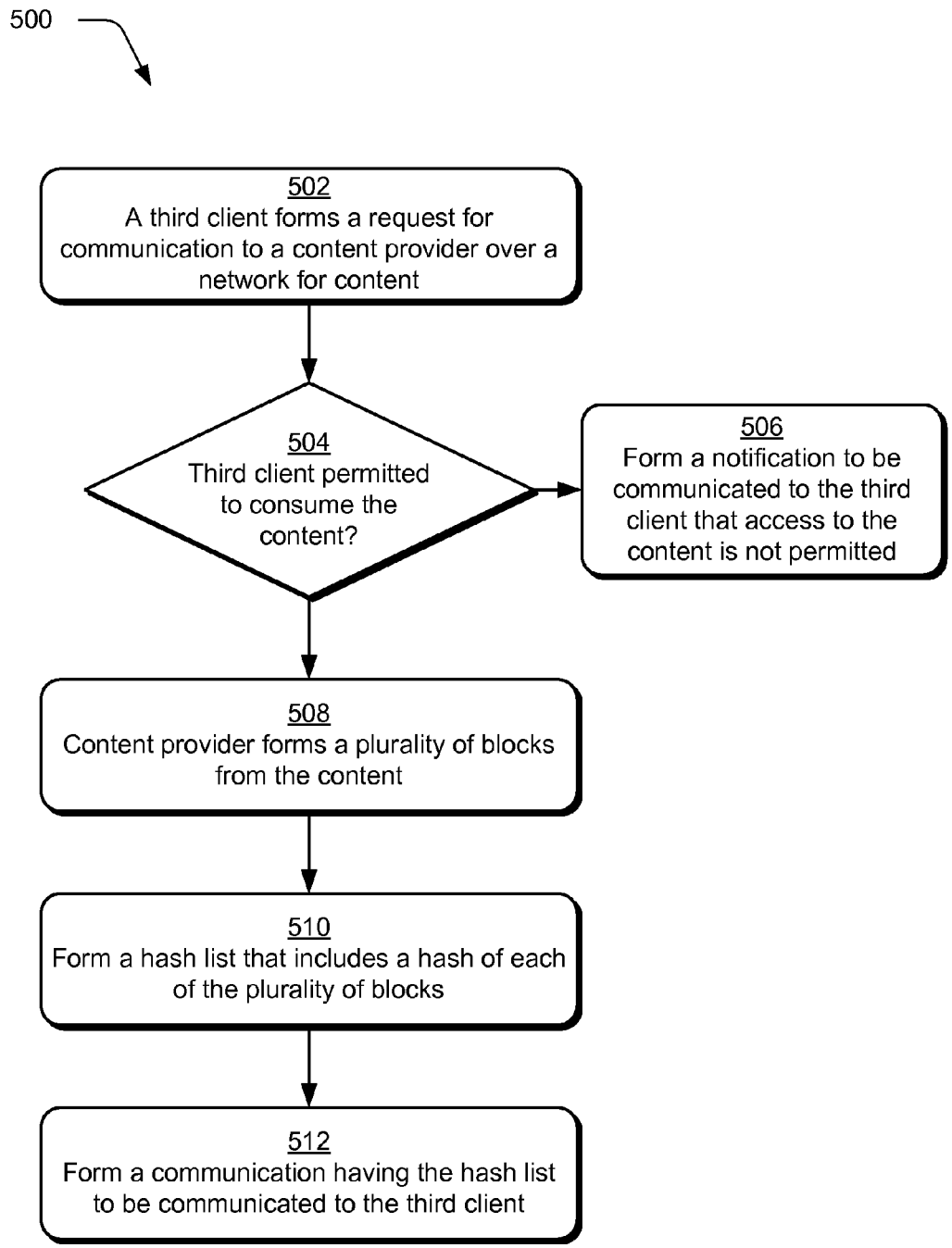
FIG. 5 is a flow diagram depicting a procedure in an example implementation in which a client requests content from a content provider that was previously provided to other clients.

FIG. 5 depicts a procedure 500 in an example implementation in which a client requests content from a content provider that was previously provided to other clients that are locally connected to the client. Continuing with the previous example, in the client forms a request for communication to a content provider over a network for content (block 502).

A determination is then made as to whether the third client is permitted to consume the content (decision block 504). When the third client is not permitted to consume the content ("no" from decision block 504), a notification is formed to be communicated to the third client that access to the content is not permitted (block 506).

When the client is permitted to consume the content ("yes" from decision block 504), the content provider forms a plurality of blocks from the content (block 508). The blocks may be formed in a variety of ways, such as to take into account network communication considerations, storage considerations, comparison considerations (e.g., for broadcast as will be later described), and so on.

A hash list is formed that includes a hash of each of the plurality of blocks (block 510). For example, a hash may be generated by applying a mathematical function to the data included in the block. A variety of different mathematical functions may be employed without departing from the spirit and scope thereof. In this way, each of the plurality of blocks may be uniquely identified, both to uniquely identify blocks within the content both from other blocks within the content and from blocks formed from other content. A communication is formed having a hash list to be communicated to the third client (block 512). Hash lists may be communicated variety of ways, such as at the HTTP layer as previously described in relation to FIG. 3.

Figure 6:
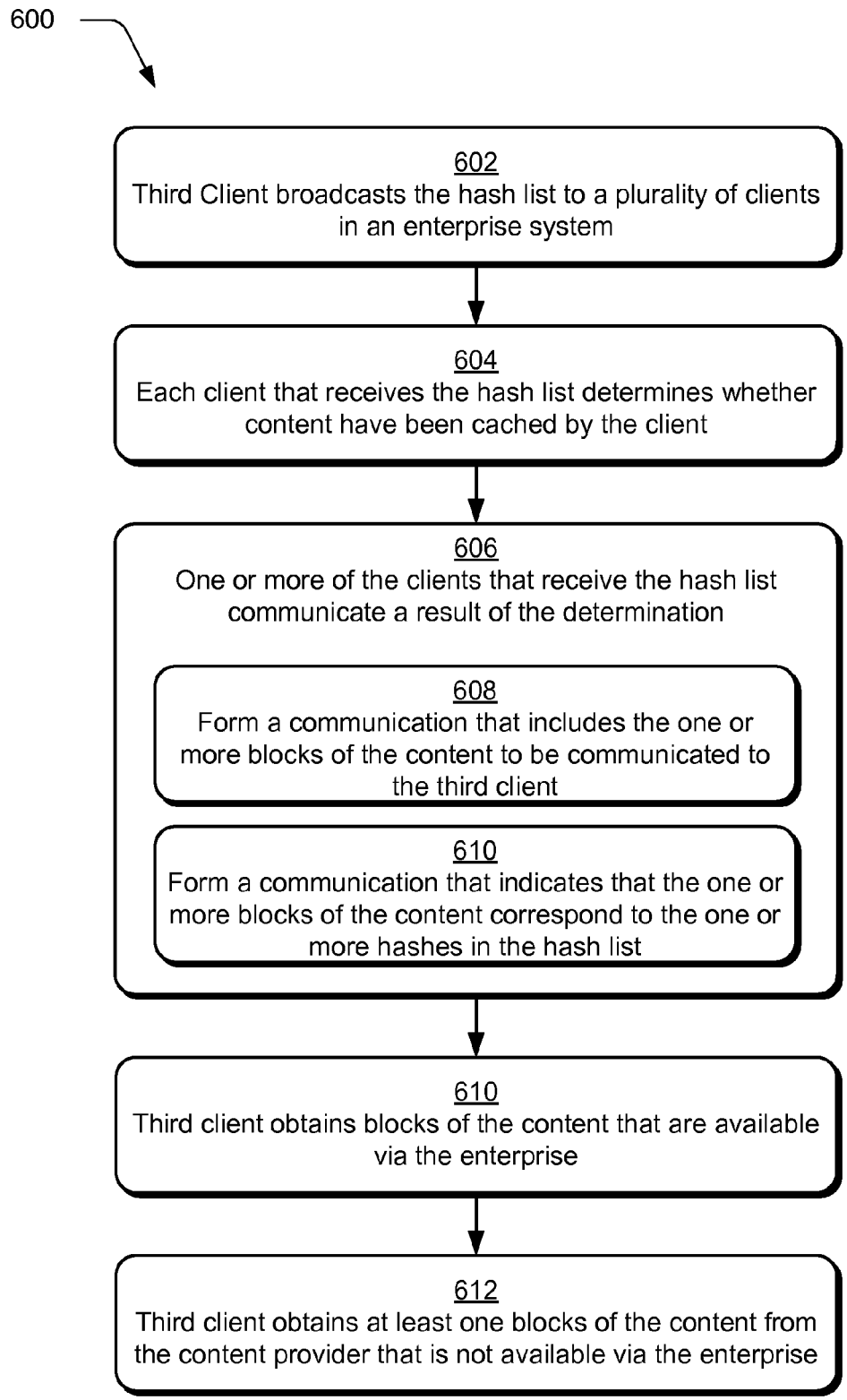
FIG. 6 is a flow diagram depicting a procedure in an example implementation in which a client obtains at least a portion of content cached by clients that previously obtained the content from a content provider and another portion of content from the content provider that is not available locally from the client.

FIG. 6 depicts a procedure 600 in an example implementation in which a client obtains at least a portion of content cached by clients that previously obtained the content from a content provider and another portion of content from the content provider that is not available locally from the client. The third client broadcast the hash list to a plurality of clients in an enterprise system (block 602).

Each client that receives the hash list determines whether content has been cached by the client (block 604). For example, client 104(1) may receive the hash list and compare hashes contained in the hash list with hashes computed from blocks of content that are cached locally at the client 104(1). In this way, the client 104(1) may determine whether or one or more blocks of the content have been previously stored in the cache 122(1) without "knowing" what actual content is included in the cache 122(1).

One or more clients that receive a hash list communicate a result of the determination (block 606). For example, the communication may be formed that includes the one or more blocks of the content to be communicated to the third client (block 608). Thus in this example, the client communicates the actual content and/or blocks of the content that are stored locally by the client in the cache. In another example, the communication is formed that indicates that the one or more blocks of the content correspond to the one or more hashes and hash list (block 610). Thus, in this way the client that broadcasted a hash list may determine which of the clients are to provide blocks of the content, e.g., such as an instance where two or more clients include the same blocks. A variety of other examples are also contemplated, such as the arbitration example previously described.

The third client obtains blocks of the content that are available via the enterprise system (block 610). For example, the enterprise system 112 may include a significant portion of blocks of the content that was requested by the client 104(N). However, some of the blocks of the content may not be available via clients in the enterprise system 112. In such an instance, the third client may obtain at least one of the blocks of the content from the content provider that is not available via the enterprise (block 612). Thus, in this instance the client 104(N) is able to avail itself of relatively quick communication times of blocks of content that are available via the enterprise system and obtain missing blocks from the content provider 102. A variety of other examples are also contemplated as previously described.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. One or more computer-readable memory devices comprising computer-executable program code that, when executed by a processor, perform a method, the method comprising:
   broadcasting a hash list to a plurality of clients in an enterprise system, wherein the hash list comprises a hash of a plurality of blocks of requested content, wherein the plurality of blocks of requested content comprise at least a first block and a second block;
   in response to broadcasting the hash list, receiving a communication from one or more of the clients in the enterprise system, wherein the communication comprises at least one of:
      one or more blocks corresponding to the hash of the plurality of blocks of the requested content; and
      an indication of the one or more blocks corresponding to the hash of the plurality of blocks of the requested content;
   obtaining the first block of the requested content from the one or more of the clients in the enterprise system;
   only when the second block of the requested content is unavailable from the one or more clients in the enterprise system, requesting the second block from a content provider that is not part of the enterprise system; and
   obtaining the second block of the requested content from the content provider without obtaining the first block from the content provider.

2. The one or more computer readable memory devices as described in claim 1, wherein the first block is locatable by the client in the enterprise system.

3. One or more computer readable memory devices as described in claim 1, wherein the method further comprises:
   determining if a client is permitted to receive content requested by the client; and
   when the client is permitted to receive the content based on the determining, forming a communication to be communicated via a wide area network that includes a hash list having a hash of each of a plurality of blocks of the content, each hash being configured to enable the client to locate a corresponding block of the content via a local network connection, wherein the forming operates at a layer of a stack that is below an applications and protocols layer.

4. One or more computer readable memory devices as described in claim 3, wherein the determining and the forming abstract this functionality to an applications and protocols layer such that software that operates at the applications and protocols layer is not aware of how the determining and the forming are performed.

5. One or more computer readable memory devices as described in claim 1, wherein the communication configures the client to broadcast the hash list to a plurality of clients to obtain at least one block of the content from the plurality of clients.

6. One or more computer readable memory devices as described in claim 3, wherein the first block was previously cached by a corresponding client locally at the client.

7. One or more computer readable memory devices as described in claim 6, wherein the at least one block that was previously cached by the corresponding client was decrypted by the client.

8. A method comprising:
   broadcasting a hash list having a hash of each of a plurality of blocks of content for receipt by a plurality of clients in an enterprise system, each hash being configured to enable a corresponding client to determine whether a corresponding block of the content is cached locally by the corresponding client, wherein the plurality of blocks of requested content comprise at least a first block and a second block;
   in response to broadcasting the hash list, receiving a communication from one or more of the clients in the enterprise system, wherein the communication comprises at least one of:
      one or more blocks corresponding to the hash of the plurality of blocks of the requested content; and
      an indication of the one or more blocks corresponding to the hash of the plurality of blocks of the requested content;
   obtaining the first block of the requested content from the one or more of the clients in the enterprise system;
   only when the second block of the requested content is unavailable from the one or more clients in the enterprise system, requesting the second block from a content provider that is not part of the enterprise system; and
   obtaining the second block of the requested content from the content provider without obtaining the first block from the content provider.

9. A method as described in claim 8, wherein the hash list is received when a client is permitted to consume the content by the content provider.

10. A method as described in claim 8, wherein the plurality of clients of the enterprise system includes a client that performs the broadcasting.

11. A method as described in claim 8, wherein:
   the plurality of clients of the enterprise system are communicatively coupled via a local area network to a client that performs the broadcasting; and the client is communicatively coupled to the content provider via a wide area network.

12. A method as described in claim 8, wherein the plurality of clients of the enterprise system is accessible, one to another, via a peer-to-peer network.

13. A method as described in claim 8, further comprising obtaining one or more blocks of the content as a result of the broadcasting.

14. A method as described in claim 13, wherein the obtaining includes receiving a communication from at least one of the plurality of clients of the enterprise system that indicates that the one or more blocks of the content are available from the at least one client.

15. A method as described in claim 8, further comprising:
responsive to the broadcasting, determining that at least one block of the content is not available from the plurality of clients; and
forming a request to be communicated to the content provider for the at least one block of the content.

16. A method as described in claim 15, wherein the forming is prompted by a Hypertext Transfer Protocol request that identifies the content.

17. One or more computer-readable memory devices comprising instructions that are executable by a processor to provide one or more modules that are callable, by a network protocol that is executing on a computer, to:
form a request to be communicated to a content provider over a network for content;
broadcast a hash list received from the content provider to a plurality of clients of an enterprise system, the hash list having a hash of each of a plurality of blocks of requested content, each hash being configured to enable a corresponding one of the clients to determine whether one or more blocks corresponding to the requested content is cached locally by the corresponding one of the clients, wherein the plurality of blocks of requested content comprise at least a first block and a second block;
obtain the first block of the requested content from the corresponding one of the clients in the enterprise system, and,
only when the second block of the requested content is unavailable from the corresponding one of the clients, request the second block from the content provider without requesting the first block from the content provider.

18. One or more computer readable memory devices as described in claim 17, wherein the network protocol is a Hypertext Transfer Protocol (HTTP).

19. One or more computer readable memory devices as described in claim 17, wherein the one or more modules are callable by an application.

20. One or more computer readable memory devices as described in claim 17, wherein:
the plurality of clients of the enterprise system are communicatively coupled via a local area network to the computer; and
the computer is communicatively coupled to the content provider via a wide area network.

* * * * *